US008594311B2

(12) United States Patent
Williams et al.

(10) Patent No.: US 8,594,311 B2
(45) Date of Patent: Nov. 26, 2013

(54) EXPECTED WAIT TIME AUGMENTATION SYSTEM AND METHOD

(75) Inventors: Mark Williams, North Canton, OH (US); Eric Camulli, Copley, OH (US); James Pavlic, Akron, OH (US); Ryszard Antonczyk, Twinsburg, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 2263 days.

(21) Appl. No.: 11/143,857

(22) Filed: Jun. 2, 2005

(65) Prior Publication Data

US 2006/0277550 A1    Dec. 7, 2006

(51) Int. Cl.
*H04M 3/00* (2006.01)
*H04M 5/00* (2006.01)

(52) U.S. Cl.
USPC ............... 379/266.06; 379/265.1; 379/266.08

(58) Field of Classification Search
USPC ............ 379/266.06, 265.06, 266.08, 266.07, 379/265.02; 705/9; 39/265.1, 265.08
See application file for complete search history.

(56) References Cited

U.S. PATENT DOCUMENTS

| | | | |
|---|---|---|---|
| 5,371,787 A | 12/1994 | Hamilton | |
| 5,430,792 A | 7/1995 | Jesurum et al. | |
| 5,506,898 A | 4/1996 | Costantini et al. | |
| 5,581,602 A | 12/1996 | Szlam et al. | |
| 5,627,884 A | 5/1997 | Williams et al. | |
| 5,724,420 A | 3/1998 | Torgrim | |
| 5,828,731 A | 10/1998 | Szlam et al. | |
| 6,041,116 A | 3/2000 | Meyers | |
| 6,278,777 B1 | 8/2001 | Morley et al. | |
| 6,546,097 B1 | 4/2003 | Peltz | |
| 6,563,921 B1 | 5/2003 | Williams et al. | |
| 6,584,191 B1 | 6/2003 | McPartlan et al. | |
| 6,694,009 B1 | 2/2004 | Anderson et al. | |
| 6,714,643 B1 * | 3/2004 | Gargeya et al. | 379/266.06 |
| 6,728,363 B2 | 4/2004 | Lieberman et al. | |
| 6,741,689 B2 | 5/2004 | Burg | |

(Continued)

FOREIGN PATENT DOCUMENTS

EP    1 478 167    11/2004

OTHER PUBLICATIONS

Sharmistha Sarkar Das et al., Application of Automatic Speech Recognition in Call Classification, IEEE, 2002, pp. 3896-3899.

(Continued)

*Primary Examiner* — Thjuan K Addy
(74) *Attorney, Agent, or Firm* — Renner, Otto, Boisselle & Sklar, LLP (57) ABSTRACT

An expected wait time augmentation system generates an expected wait value representing a time duration expected to elapse before a subject client is connected to a resource for servicing. The expected wait time augmentation system comprises an interface to a work force management system for obtaining resource availability data and a wait time augmentation model for calculating an expected wait time value as a function of base expected wait time data and the resource availably data. The estimated wait time value is provided to the subject client. The resource availability data includes, but is not limited to, for a period of time: i) availability of resources; and ii) a scheduled change in the availability of resources. The scheduled change in the availability of resources may comprise a combination of data representing an effective time and a quantity of resources scheduled to be available at the effective time.

24 Claims, 5 Drawing Sheets

| Effective Time 210 | Resource Group ID 212 | Resource Availability 214 |
|---|---|---|
| 27:05 | Group 22b | Resource Total (30) |
| 27:10 | Group 22d | Resource Change (-3) |
| | | |
| | | |

208

(56) References Cited

U.S. PATENT DOCUMENTS

| | | | |
|---|---|---|---|
| 6,748,060 | B2 | 6/2004 | Lee et al. |
| 6,754,332 | B1 | 6/2004 | Kneipp et al. |
| 6,754,334 | B2 | 6/2004 | Williams et al. |
| 6,766,013 | B2 | 7/2004 | Flockhart et al. |
| 6,829,331 | B2 | 12/2004 | Cullis |
| 6,850,602 | B1 | 2/2005 | Chou |
| 6,882,641 | B1 | 4/2005 | Gallick et al. |
| 6,898,190 | B2 | 5/2005 | Shtivelman et al. |
| 7,085,367 | B1 * | 8/2006 | Lang .................. 379/265.06 |
| 7,174,011 | B2 | 2/2007 | Kortum et al. |
| 2002/0114442 | A1 * | 8/2002 | Lieberman et al. ...... 379/266.06 |
| 2003/0083875 | A1 | 5/2003 | Brown et al. |
| 2004/0002865 | A1 | 1/2004 | Chan et al. |
| 2005/0065837 | A1 * | 3/2005 | Kosiba et al. ................. 705/9 |
| 2005/0129217 | A1 | 6/2005 | McPartlan et al. |
| 2006/0256949 | A1 | 11/2006 | Noble |

OTHER PUBLICATIONS

Harry Levit, PhD, Noise Reduction in Hearing Aids: An Overview, Journal of Rehabilitation Research and Development, vol. 38, No. 1, Jan./Feb. 2001.

Steve Borne, Ringback Tones, Revenue at our Doorstep, Wireless Business and Technology, Oct. 6, 2004, www.sys-con.com.

Rednova, Globe Telecom's Ringback Tone Service Surpasses 100,000 Subscriber in the First Week of Launch, www.rednova.com, Apr. 27, 2004.

Sunmicrosystems, Ringback Tones help Carriers Dial Up New Profits, Boardroom Minutes, Aug. 2004, www.sun.com.

Jefferson Graham, Cell Phone Users Provide Musical Interlude for Callers, USA Today, Dec. 7, 2004, www.usatoday.com.

International Search Report for corresponding International Application No. PCT/US08/67080, dated Oct. 6, 2008.

Written Opinion for corresponding International Application No. PCT/US08/67080, dated Oct. 6, 2008.

International Search Report for corresponding International Application No. PCT/US08/075541, dated Feb. 26, 2009.

Written Opinion for for corresponding International Application No. PCT/US08/075541, dated Feb. 26, 2009.

U.S. Appl. No. 11/246,409, filed Oct. 7, 2005, for Automated System and Method for Distinguishing Audio Signals Received in Response to Placing and Outbound Call.

U.S. Appl. No. 11/820,253, filed Jun. 19, 2007, for Accessory Queue Management System and Method for Interacting With a Queuing System.

U.S. Appl. No. 11/901,186, filed Sep. 14, 2007, for Expected Wait Time System With Dynamic Array.

U.S. Appl. No. 11/206,723, filed Aug. 18, 2005, for Resource Based Queue Management System and Method.

European Search Report for European Application No. 06816246.0, dated Apr. 7, 2009.

* cited by examiner

Figure 7
(Schedule Interface System)

Steps in Figure 7:
- Start
- Receive Resource Availability Request — 200
- Look Up Resource Availability Data — 202
- Format Resource Availability Response — 204
- Provide Availability Response — 206

| Effective Time 210 | Resource Group ID 212 | Resource Availability 214 |
|---|---|---|
| 27:05 | Group 22b | Resource Total (30) |
| 27:10 | Group 22d | Resource Change (-3) |
|  |  |  |
|  |  |  |

# EXPECTED WAIT TIME AUGMENTATION SYSTEM AND METHOD

TECHNICAL FIELD

The present invention relates to calculating a predicted duration of time a client is expected to wait before being connected to a resource for servicing. More particularly, the present invention relates to generating an augmented expected wait time value which is a function of base expected wait time data and data related to the availability, and/or scheduled change in availability, of resources for servicing clients.

BACKGROUND OF THE INVENTION

Automatic call director (ACD) technology is a well known technology that: i) accepts incoming calls from calling clients; ii) queues calling clients on hold for connection to a service representative; and iii) when a service representative is available, connects the customer from the queue to the available service representative.

ACD systems also include expected wait time systems which, as a courtesy, notify a caller of the predicted time which the caller will need to wait in queue until a service representative is available.

Several known models exist for calculating estimated wait time. For example, in U.S. Pat. No. 5,506,898 to Costantini et al., a system for calculating an estimated wait time includes: i) calculating a rate of advance for each caller in the queue; ii) calculating a weighted average rate of advance; and calculating an estimated wait time for a caller as a function of the weighted average rate of advance and the caller's position in the queue.

In a variation, it is also known to calculate the predicted wait time as a function of the number of calls waiting in queue and a time factor—which is a value representing an average time for servicing clients.

Further yet, it is known to track the status of a service being provided to a caller who has connected to service representative to estimate when that particular call will be completed and the representative will be available to take the next call in the queue. For example, in U.S. Pat. No. 6,694,009 to Anderson et al., information is collected about a plurality of "points in the processing of a call". This collected information is combined with historical information related to processing of calls to estimate how long it is likely to take until the call is completed.

It is also known to track a historical average time spent in queue by calls that have been processed by the queue and calculate predicted wait time as a function of historical wait time and the client's position in the queue.

A problem with existing estimated wait time calculation schemes is that they are all subject to significant inaccuracies, particularly if used in conjunction with a service representative work force that that changes over various time periods throughout the day.

For example, if the number of service representatives is increased, the number of customers that can be simultaneously serviced is also increased. This would likely result in a calculated expected wait time value which represents a time duration that is inaccurately longer than that actually experienced by the caller. The same is true in reverse. If the number of service representatives is decreased, the number of customers that can be simultaneously serviced is also decreased. This would likely result in a calculated expected wait time value which represents a time duration that is inaccurately shorter than that actually experienced by the caller.

What is needed is a system and method for improving the accuracy of a wait time calculation and, more particularly, improving the accuracy of a wait time calculation in an environment wherein a work force changes over various time periods through out the day. Further, what is needed is such a system that is useful for providing callers with a predicted wait time that reflects predicted changes in the availability of service representatives.

SUMMARY OF THE INVENTION

The present invention comprises an expected wait time augmentation system. The wait time augmentation system generates an expected wait value representing a time duration expected to elapse before a subject client is connected to a resource for servicing.

The expected wait time augmentation system comprises an interface to a work force management system for obtaining resource availability data and a wait time augmentation model for calculating an expected wait time value as a function of base expected wait time data and the resource availably data. The estimated wait time value is provided to the subject client.

The resource availability data includes, but is not limited to, for a period of time: i) availability of resources; and ii) a scheduled change in the availability of resources. The scheduled change in the availability of resources may comprise a combination of data representing an effective time and a quantity of resources scheduled to be available at the effective time.

As examples, the base expected wait time data may comprise an expected wait time calculated using known systems or data useful for calculating an expected wait time using known system.

A second aspect of the present invention is to provide a method of notifying a subject client of an expected wait value representing a time duration expected to elapse before the subject client is connected to a resource for servicing. The method comprises: i) obtaining resource availability data; ii) calculating an expected wait time value as a function of base expected wait time data and the resource availability data; and iii) providing an indication of the expected wait time value to the subject client.

Again, the resources availability data may comprise: i) availability of resources; and ii) a schedule change in the availability of resources at an effective time.

Again, exemplary expected wait time data may comprise an expected wait time calculated using known systems or data useful for calculating an expected wait time using known system.

A third aspect of the present invention is to provide a system for notifying a subject client of an expected wait value representing a time duration expected to elapse before the subject client is connected to a resource for servicing.

The system comprises an automated call director receiving a call initiated by the subject client, a work force management system providing resource availability data, a wait time augmentation system for calculating an expected wait time value as a function of base expected wait time data and the resource availably data, and an interface for providing the expected wait time value to the subject client. The wait time augmentation system and the interface may, or may not be, components of the automated call director.
}

Again, the resources availability data may comprise: i) availability of resources; and ii) a schedule change in the availability of resources at an effective time.

Again, exemplary expected wait time data may comprise an expected wait time calculated using known systems or data useful for calculating an expected wait time using known system.

A fourth aspect of the present invention is to provide an accessory device for operation with an automated call director and a work force management system. The accessory device generates an expected wait time value representing a time duration expected to elapse before the subject client is connected to a resource for servicing.

The accessory device comprises a data communication link to the work force management system for receiving resource availability data, a wait time augmentation system for calculating an expected wait time value as a function of base expected wait time data and the resource availability data, and a data communication link to the automated call director for providing the expected wait time value to the subject client.

Again, the resources availability data may comprise: i) availability of resources; and ii) a schedule change in the availability of resources at an effective time.

Again, exemplary expected wait time data may comprise an expected wait time calculated using known systems or data useful for calculating an expected wait time using known system.

For a better understanding of the present invention, together with other and further aspects thereof, reference is made to the following description, taken in conjunction with the accompanying drawings. The scope of the present invention is set forth in the appended claims.

DETAILED DESCRIPTION OF THE EXEMPLARY EMBODIMENTS

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Figure 1:
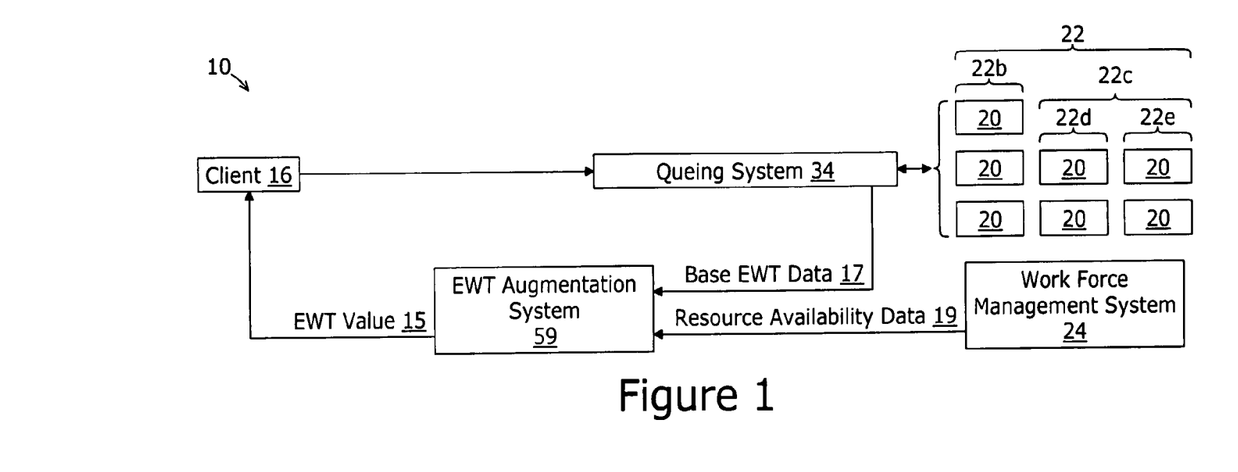
FIG. 1 is a block diagram representing an exemplary wait time augmentation system in accordance with one embodiment of the present invention.

FIG. 1 represents an overview of a system 10 for providing an estimated wait time value 15 to a client 16 waiting in a queuing system 34 for servicing by a resource 20.

Each resource 20 may be a service representative system for enabling a service representative to take a call from a client 16 and service the requests of clients 16. The resources 20 may be for a single group of resources or may be for resources 20 divided into resource groups based on the skill set of the service representative using the resource 20.

For example, each resource 20 may include similar structure for enabling a service representative to perform his or her duties, however, resource group 22b may be resources 20 which are operated by Spanish speaking service representatives while resource group 20c may be resources 20 operated by English speaking service representatives. Subgroup 22d may be primary recourses 20 operated by English speaking service representatives with ability to help a caller 16 with billing inquiries and subgroup 22e may be primary recourses 20 operated by English speaking service representatives with ability to help a caller 16 with technical service issues.

The system 10 comprises an estimated wait time augmentation system 59 receiving base estimated wait time information 17 and resource availability data 19. The estimated wait time augmentation system 59 calculates the estimated wait time value 15 as a function of the base estimated wait time information 17 and the resource availability data 19.

The base estimated wait time information 17 represents an estimated wait time calculated using traditional estimated wait time techniques and/or data useful for calculating an estimated wait time using traditional estimated wait time techniques.

For example, data useful for calculating an estimated wait time using traditional estimated wait time techniques may include a quantity of clients expected to be serviced by available resources prior to the subject client (e.g. the caller's position in the queue) and a combination of one or more of: i) advance rate data representing an expected or average rate of advancement of a clients in the queue; ii) service rate data representing an expected or average time required to service one or more clients in queue; and/or iii) historical wait time data representing time durations which other clients waited in queue before connecting to a resource. Such information may be further supplemented by an indication of resource availability during time periods during which the historical wait time is measured.

The resource availability data 19 represents information useful for modifying a traditional calculated estimated wait time or modifying a traditional estimated wait time calculation to reflect a scheduled increase or decrease in the quantity of resources 20 available for servicing clients 16.

Figure 2:
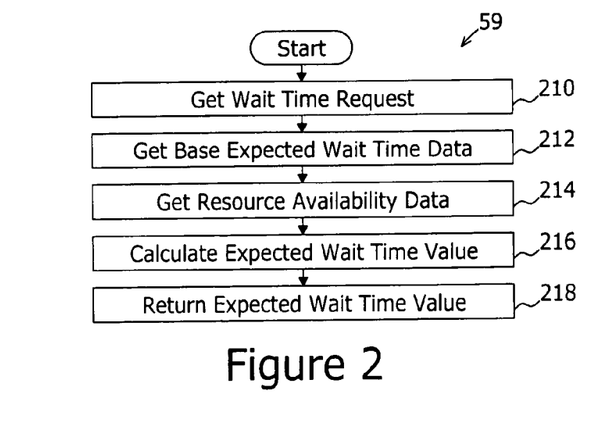
FIG. 2 is a flow chart representing a first aspect of exemplary operation of an expected wait time calculation application in accordance with an embodiment of the present invention.

The flow chart of FIG. 2 represents one example of operation of an expected wait time augmentation system 59.

Step 210 represents obtaining a request to calculate an expected wait time value 15 as a function of base expected wait time information 17 and resource availability data 19.

Step 212 represents obtaining the base estimated wait time information 17. It is envisioned that the request to calculated an expected wait time value 15 may be a processing call from another local or remote application. It is further envisioned that the base expected wait time information may be provided in the processing call. In which case, steps 210 and 212 may, in combination, represent such a processing call.

As discussed, the base estimated wait time information 17 may represents an estimated wait time calculated using traditional estimated wait time techniques and/or data useful for calculating an estimated wait time using traditional estimated wait time techniques—such as identity of the resource group 22 needed for servicing the client, quantity of clients expected to be serviced by available resources prior to the subject client, and a combination of one or more of: i) advancement rate data; ii) service time data; and/or iii) historical wait time data.

Step 214 represents obtaining resource availability data 19 from the work force management system 24. The resource availability data 19 may specify a time duration (or be for a preconfigured time duration) and specify a value representing a quantity of resources available and/or scheduled to be available (for one or more resource groups) within the specified or preconfigured time duration.

Step 216 represents calculating the expected wait time value 15 using a mathematical functions which generate an expected wait time value 15 based on both the base expected wait time information 17 and resource availability data 19.

Step 222 represents providing the expected wait time value to the subject client 16.

Figure 3:
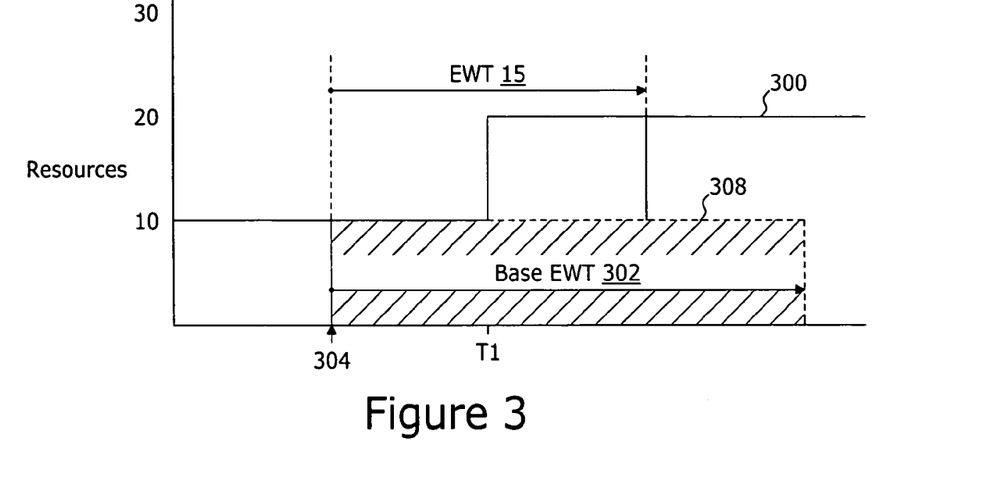
FIG. 3 is a graphical representation of a first aspect of a system for calculating an expected wait time as a function of resource availability data and base expected wait time date.

FIG. 3 is a graphical representation of a model for calculating an expected wait time value 15 as a function of resource availability data 19 and base expected wait time information 17 wherein the base expected wait time information 17 is an expected wait time calculated using a traditional expected wait time calculation.

The graph of FIG. 3 plots a quantity of available resources (vertical access) with respect to time (horizontal access) with line 300 representing resource availability (e.g. the quantity of resources available (and scheduled to be available) at various times including times into the future.

The base expected wait time information 17 includes a base expected wait time value 302 calculated using a traditional expected wait time calculation. The base expected wait time 302 represents a period of time commencing at the time of calculation (the base EWT effective time 304) and encompasses the time period during which a client can be expected to wait before being connected to a resource. The quantity of available resources may be scheduled to change at time T1 which is within the base expected wait time 302.

Because the base expected wait time 302 encompasses a time period in which the number of resources available is different than the number of resources available at the base EWT effective time 304, the expected wait time augmentation system 59 adjusts the base expected wait time 302 in view of the scheduled change in available resources to generate the expected wait time value 15. The expected wait time value 15 is shorter than the base expected wait time 302 because the quantity of resources is scheduled to increase at time T1. As an example, expected wait time value 15 conceptually is a time value such that an area under the resources availability line 300 during the expected wait time value 15 corresponds to, or is equal to, the area 308—which represents an area under a horizontal extension of the resource availability at the base EWT effective time 204 for the duration of the base expected wait time 302.

Figure 4:
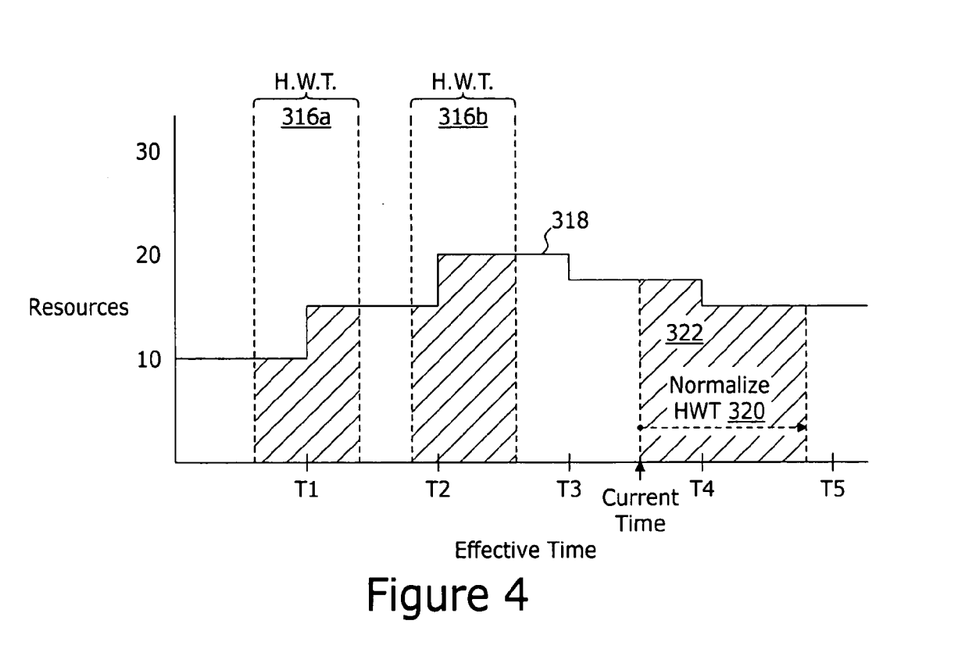
FIG. 4 is a graphical representation of a second aspect of a system for calculating an expected wait time as a function of resource availability data and base expected wait time date.

FIG. 4 is a graphical representation of a model for calculating an expected wait time value 15 as a function of resource availability data 19 and base expected wait time information 17 wherein the base expected wait time information 17 is historical wait time data useful for calculating an expected wait time value using a known system for calculating an estimated wait time as a function of one or more historical wait time values. While the model of FIG. 3 the estimated wait time augmentation system 59 adjusts a base expected wait time calculated using a known system in view of scheduled resource changes. However, while using the model of FIG. 4 the estimated wait time augmentation system 59 adjusts input variables (e.g. the historic wait time values) in view of scheduled resource changes before such variables are input to a traditional system for calculating an estimated wait time.

The graph of FIG. 4 plots a quantity of available resources (vertical access) with respect to time (horizontal access). The quantity of available resources may have changed and be scheduled to change at each effective time T1 though T5. Because the expected wait time to be calculated may encompass a time period in which the number of resources available is different than the number of resources available during the time periods in which the historical wait time data was measured, the historic wait time data is "normalized" to reflect the then current number of resources available and expected changes in resource availability before being input to a traditional expected wait time algorithm. The normalized historic wait time 320 is the duration of time required such that the area 322 under the resources line 318 corresponds to, or is equal to, the area under the resource line 318 during the time period (for example period 316*b*) in which the historic wait time data was obtained. Or, if the historic wait time data comprises multiple historic wait time periods 316*a* and 316*b*, the average area under the resource line 318 for each of the historical wait times 316*a* and 316.

Figure 5:
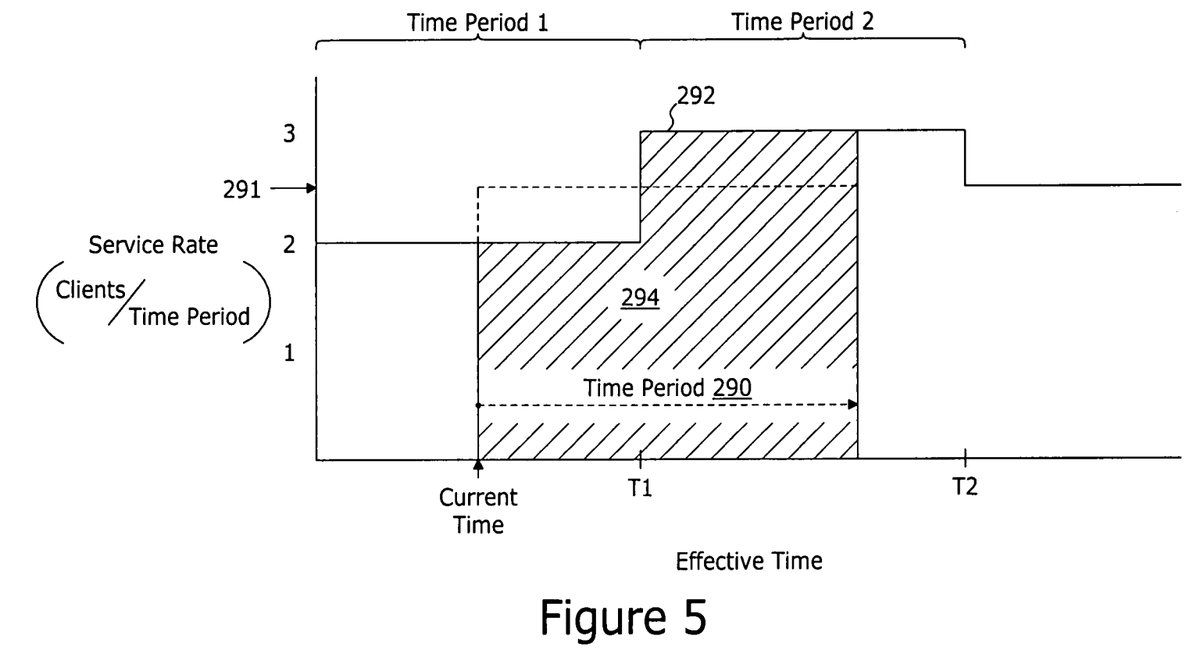
FIG. 5 is a graphical representation of a third aspect of a system for calculating an expected wait time as a function of resource availability data and base expected wait time date.

FIG. 5 is a graphical representation of another model for calculating an expected wait time value 15 as a function of resource availability data 19 and base expected wait time information 17 when the base expected wait time information 17 includes advancement rate data, service rate data, or other rate data useful for calculating an expected wait time using a known system for calculating an expected wait time as a function of the quantity of clients in queue and rate data.

Like the model of FIG. 4, when using the model of FIG. 5 the estimated wait time augmentation system 59 adjusts input variables (e.g. the rate information) in view of scheduled resource changes before such variables are input to a traditional system for calculating an estimated wait time.

A rate (vertical access) is plotted with respect to time (horizontal access). The rate corresponds to an advancement rate, service rate, and/or similar rate information. A service rate is shown in FIG. 5.

The rate is adjusted to reflect changes in resources over periods of time. For example, the service rate during time period 1 is equal to two clients per unit of time and the service rate during time period 2 is equal to three clients per unit of time. The change in resource availability which changes the service rate occurs (or is scheduled to occur) at an effective time of T1.

The quantity of available resources may have changed and be scheduled to change at each effective time T1 and T2. Because the expected wait time to be calculated may encompass a time period in which the number of resources available is different than the number of resources available during the time period during which the rate data is applicable, the rate data is "normalized" to reflect the schedule change in resource availability before being input to a traditional expected wait time algorithm.

A normalized rate 291 is the rate such that the area 294 under the resources line 292 for a time period 290 on the order of the expected wait time to be calculated corresponds to, or is equal to, the normalized rate 291 multiplied by the time period 290 (e.g. the area under the dashed line.

Work Force Management System

The workforce management system 24 provides resource availability data 19 to the estimated wait time augmentation system 59.

In general, the workforce management system 24 is a known software application used for scheduling working hours of service representatives who operate the resources 20. Typically, the start time, end time, and break times of each service representative are scheduled by a workforce management system 24 based on historic need for resources 20. A full discussion of the workforce management system 24 and its operation is not relevant to the scope of the present invention.

Figure 6:
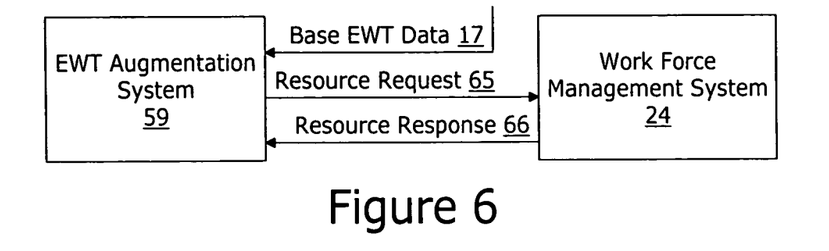
FIG. 6 is a block diagram representing an exemplary communication between an expected wait time augmentation system and a work force management system in accordance with one embodiment of the present invention.

In one embodiment of the present invention, with reference to FIG. 6, the expected wait time augmentation system 59 may make a resource availability request 65 to an exposed application interface of the work force management system 24 and receive the resource availability response 66 (which includes resource availability data 19) as a response to the request 65. In this embodiment, step 216 of FIG. 2 (get resource availability data) and step 306 of FIG. 4 (get resource availability data) correspond to the wait time augmentation system 59 making a resource availability request 65 and receiving a resource availability response 66.

Figure 7:
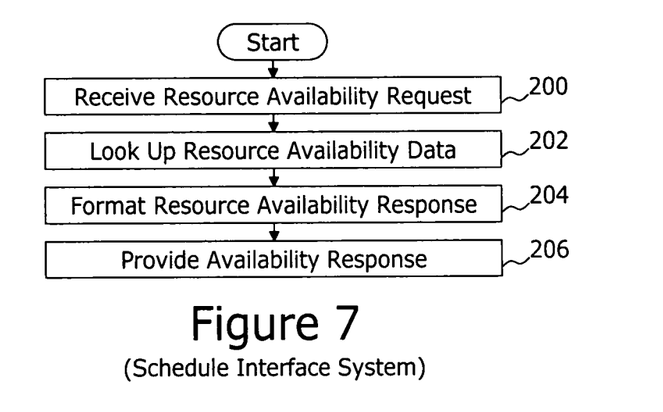
FIG. 7 is a flow chart representing exemplary operation of a work force management system in accordance with one embodiment of the present invention.

FIG. 7 represents exemplary operation of an aspect of the work force management system 24 which provides resource availability data 19 to the expected wait time augmentation system 59. Referring to FIG. 7 in conjunction with FIG. 6, step 200 represents the work force management system 24 receiving a resource availability request 65. An example of information components that may be included in the request 65 are: i) a time frame for which resource availability data is requested; and/or ii) identification of a resource group 22 for which resource availability data 66 is requested.

Step 202 represents calculating and/or obtaining (for example looking up, in a resource availability data base), resource availability data corresponding to the request 65.

Step 204 represents formatting the resource availability data 19 into a resource availability response 66, and step 206 represents providing the resource availability response 66 to the expected wait time augmentation system 59.

An example of information components that may be included in the response 66 are: i) an identification of the availability of resources 20 (or a change in the availability of resources 20); ii) an effective time for the identification of the availability of resources 20 (or change in the availability of resources 20); and/or iii) an identification of the resource group 22 of the resources 20 (or changes in resources 20).

Figure 8:
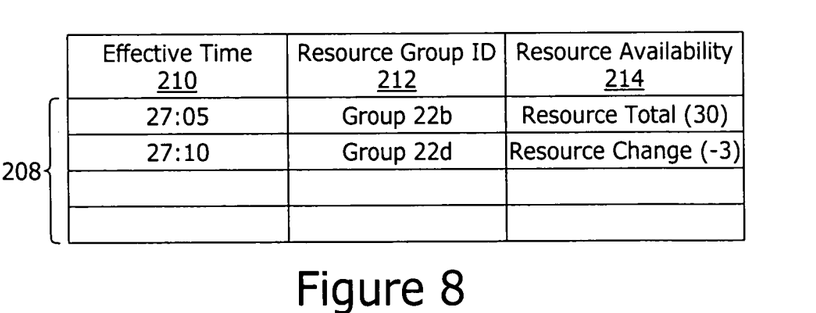
FIG. 8 is a table representing an exemplary resource availability response in accordance with one embodiment of the present invention.

FIG. 8 represents a graphic example of one format in which resource availability data components may be formatted for a resource response 66. The response 66 may include a plurality of records 208. Exemplary fields of each record 208 may include: i) an effective time field 210 which identifies a time at which the resources (or resource changes) within the record 208 become effective; ii) a resource group ID field 212 which identifies the resource group 22 of the resources (or resource changes) identified within the record 208; and iii) a resource availability field 214 identifying a total number of resources within the resource group 22 available at the effective time or identifying a change in the total number of resources within the resource group at the effective time.

It should be appreciated that FIG. 8 represents just one example of a resource availability response 66, those skilled in the art understand that resource availability data 19 useful for the practice of the present invention may be formatted and transferred form the work force management system 24 to the accessory device 12 using many alternative formats.

Example of Use with an ACD

Figure 9:
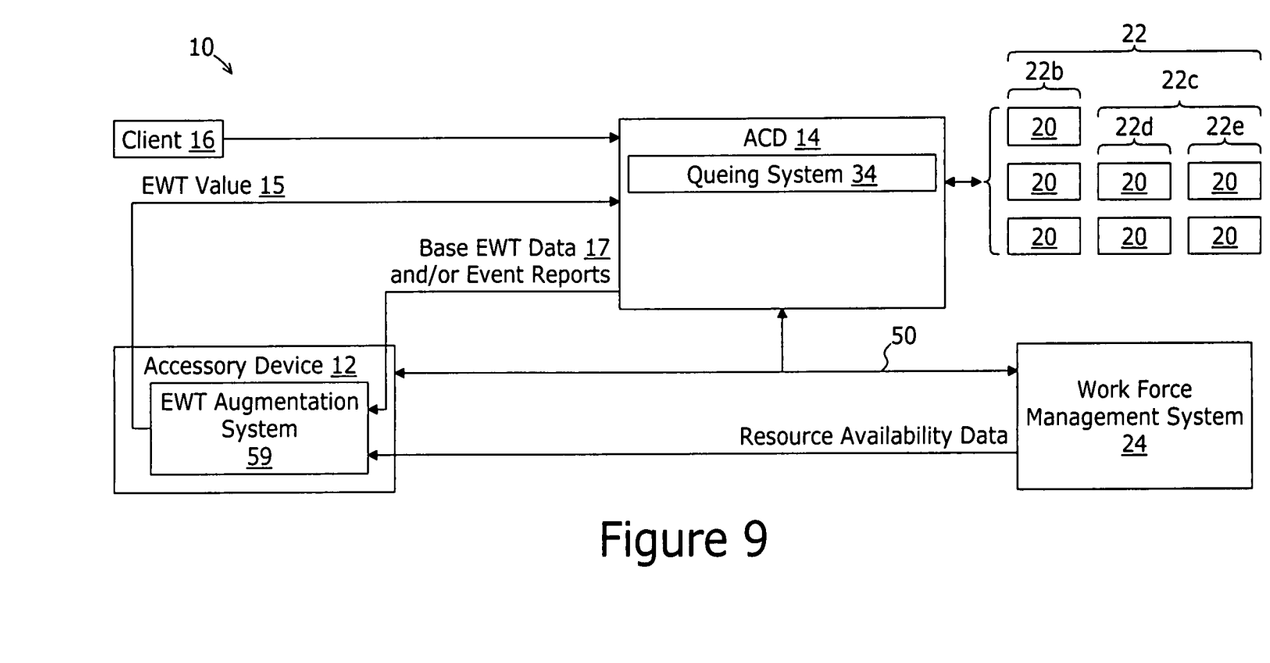
FIG. 9 is a block diagram representing an exemplary wait time augmentation system implemented in an accessory device to an automated call director in accordance with one embodiment of the present invention.

The block diagram of FIG. 9 represents an example of the present invention wherein the expected wait time augmentation system 59 is embodied in an accessory device to an automated call director. Referring to FIG. 9, components for operation of this embodiment of the present invention include the automated call director (ACD) 14, the accessory device 12, the work force management system 24, and a plurality of resources 20—which may be arranged within a single group or within multiple resource groups 22.

The ACD 14 includes a queuing system 34 and other known ACD technology for queuing calls placed by clients 16 for connection to resources 20 and, when a resource 20 becomes available, connecting a client 16 from the queuing system 34 to the available resource 20. The queuing system 34 may be an application which maintains listings or queues related to: i) the order in which clients 16 have connected to the ACD 14; and ii) the resource group 22 which is to handle the request of the client 16.

The accessory device 12 comprises the expected wait time augmentation system 59, an interface for obtaining resource availability data 19 from the work force management system 24, an interface for obtaining at least one of base expected wait time information 17 and event reports from the ACD 14, and an interface for providing the expected wait time value 15 to the ACD 14 for delivery to the subject client 16. It should be appreciate that each of the above discussed interfaces may be the logical exchange of information one or more data communications networks 50 which interconnect the accessory device 12 to the ACD 14 and the work force management system 24.

As discussed with respect to FIG. 1, the expected wait time augmentation system 59: i) obtains and/or calculates base estimated wait time information 17; ii) obtains resource availability data 19; and iii) calculates the estimated wait time value as a function of the base estimated wait time information 17 and the resource availability data 19.

In one sub embodiment, the base estimated wait time information 17 may be provided by the ACD 14. In another sub embodiment, the ACD 14 may report, to the accessory device 12, events useful for calculating base estimated wait time information 17. The accessory device 12 would then use the event reports for generating base estimated wait time information 17. Examples of events reports to the accessory device 12 may include, but are not limited to: i) events related to connection of a client 16; ii) events related to connection of a client 16 to a resource 20; and/or iii) disconnection of a client 16 from a resource 20 and/or the ACD 14.

In summary, it should be appreciated that the systems of the present invention provide for notification of a calling client of an expected wait time that is a more accurate estimate of an expected wait time due to the inclusion of forecast changes in resources within the wait time calculation model.

Although the invention has been shown and described with respect to certain exemplary embodiments, it is obvious that equivalents and modifications will occur to others skilled in the art upon the reading and understanding of the specification. The present invention includes all such equivalents and modifications, and is limited only by the scope of the following claims.

What is claimed is:

1. An expected wait time augmentation system for interfacing with a work force management system and an automated call director call routing system and generating an augmented expected wait value representing a time duration expected to elapse before a subject client is connected to a resource for servicing, the expected wait time augmentation system comprising:
an interface to the work force management system and/or the automated call director call routing system for obtaining current resource availability data, the resource availability data including, for a period of time:
current availability of resources;
current inflow of call volumes; and
a forecasted change in the availability of resources;
a wait time augmentation model that receives base expected wait time data and calculates the augmented expected wait time value as a function of the base expected wait time data and the resource availably data; and
an interface for providing the augmented expected wait time value to the subject client.

2. The expected wait time augmentation system of claim 1, wherein the forecasted change in the availability of resources comprises a combination of data representing an effective time and a quantity of resources scheduled to be available at the effective time.

3. The expected wait time augmentation system of claim 2, wherein the base expected wait time data comprises an expected wait time.

4. The expected wait time augmentation system of claim 2, wherein the base expected wait time data comprises:
i) a rate selected from one of an advancement rate and a service rate; and
ii) a quantity of clients expected to be serviced by available resources prior to the subject client.

5. The expected wait time augmentation system of claim 2, wherein the base expected wait time data comprises a historical wait time and a quantity of clients expected to be serviced by available resources prior to the subject client.

6. The expected wait time augmentation system of claim 5, wherein the historical wait time represents time durations which other clients waited before connecting to a resource and an indication of resource availability during time periods during which the historical wait time is measured.

7. A method of notifying a subject client of an augmented expected wait value representing a time duration expected to elapse before a subject client is connected to a resource for servicing, the method comprising:
obtaining a base expected wait time data;
obtaining current resource availability data, the resources availability data comprising:
current availability of resources;
current inflow of call volumes; and
a forecasted change in the availability of resources at an effective time;
calculating the augmented expected wait time value as a function of the base expected wait time data and the resource availability data; and
providing an indication of the augmented expected wait time value to the subject client.

8. The method of claim 7, wherein the forecasted change in the availability of resources comprises a combination of data representing an effective time and a quantity of resources scheduled to be available at the effective time.

9. The method of claim 8, wherein the base expected wait time data comprises an expected wait time.

10. The method of claim 8, wherein the base expected wait time data comprises:
i) a rate selected from one of an advancement rate and a service rate; and
ii) a quantity of clients expected to be serviced by available resources prior to the subject client.

11. The method of claim 8, wherein the base expected wait time data comprises a historical wait time and a quantity of clients expected to be serviced by available resources prior to the subject client.

12. The method of claim 11, wherein the historical wait time represents time durations which other clients waited before connecting to a resource and an indication of resource availability during time periods during which the historical wait time is measured.

13. A system for notifying a subject client of an augmented expected wait value representing a time duration expected to elapse before the subject client is connected to a resource for servicing, the system comprising:
an automated call director call routing system configured to receive a call initiated by the subject client;
a work force management system providing current resource availability data, the current resource availability data including, for a period of time:
current availability of resources;
current inflow of call volumes; and
a forecasted change in the availability of resources;
a wait time augmentation system that receives a base expected wait time data and calculates the augmented expected wait time value as a function of the base expected wait time data and the current resource availably data; and
an interface for providing the augmented expected wait time value to the subject client.

14. The system of claim 13, wherein the forecasted change in the availability of resources comprises a combination of data representing an effective time and a quantity of resources scheduled to be available at the effective time.

15. The system of claim 14, wherein the base expected wait time data comprises an expected wait time.

16. The system of claim 14, wherein the base expected wait time data comprises:
i) a rate selected from one of an advancement rate and a service rate; and
ii) a quantity of clients expected to be serviced by available resources prior to the subject client.

17. The system of claim 14, wherein the base expected wait time data comprises a historical wait time and a quantity of clients expected to be serviced by available resources prior to the subject client.

18. The system of claim 17, wherein the historical wait time represents time durations which other clients waited before connecting to a resource and an indication of resource availability during time periods during which the historical wait time is measured.

19. An accessory device for operation with an automated call director call routing system and/or a work force management system, the accessory device generating an augmented expected wait time value representing a time duration expected to elapse before a subject client is connected to a resource for servicing, the accessory device comprising:
- a data communication link to the work force management system for receiving current resource availability data, the current resource availability data including, for a period of time:
  - current availability of resources;
  - current inflow of call volumes; and
  - a forecasted change in the availability of resources;
- a wait time augmentation system that receives a base expected wait time data and calculates the augmented expected wait time value as a function of base expected wait time data and the resource availability data; and
- a data communication link to the automated call director for providing the augmented expected wait time value to the subject client.

20. The accessory device of claim 19, wherein the scheduled change in the availability of resources comprises a combination of data representing an effective time and a quantity of resources scheduled to be available at the effective time.

21. The accessory device of claim 20, wherein the base expected wait time data comprises an expected wait time.

22. The accessory device of claim 21, wherein the base expected wait time data comprises:
 i) a rate selected from one of an advancement rate and a service rate; and
 ii) a quantity of clients expected to be serviced by available resources prior to the subject client.

23. The accessory device of claim 21, wherein the base expected wait time data comprises a historical wait time and a quantity of clients expected to be serviced by available resources prior to the subject client.

24. The accessory device of claim 23, wherein the historical wait time represents time durations which other clients waited before connecting to a resource and an indication of resource availability during time periods during which the historical wait time is measured.

* * * * *